United States Patent [19]
Zabinski et al.

[11] Patent Number: 5,751,598
[45] Date of Patent: May 12, 1998

[54] WATER SOFTENING APPARATUS WITH MICROPROCESSOR CONTROL

[75] Inventors: John E. Zabinski, Naperville; Roger Rehfeldt, Arlington Heights, both of Ill.

[73] Assignee: Culligan International Company, Northbrook, Ill.

[21] Appl. No.: 604,772

[22] Filed: Feb. 22, 1996

[51] Int. Cl.$^6$ ..................................................... C02F 5/00
[52] U.S. Cl. ...................... 364/500; 364/502; 210/143; 210/190
[58] Field of Search ..................... 364/500, 496, 364/502, 510, 140, 141, 143–147, 188, 189, 191; 137/624.15, 624.14; 210/143, 190, 191, 662, 687

[56] References Cited

U.S. PATENT DOCUMENTS

| | | | |
|---|---|---|---|
| 3,627,133 | 12/1971 | Rak | 210/98 |
| 3,897,798 | 8/1975 | De Vale | 137/5 |
| 4,299,698 | 11/1981 | Rak et al. | 210/96.1 |
| 4,536,845 | 8/1985 | DeVale et al. | 364/500 |
| 5,422,014 | 6/1995 | Allen et al. | 210/743 |

FOREIGN PATENT DOCUMENTS 1117624  1/1982  Canada.

OTHER PUBLICATIONS

1994 Culligan International Company, *Culligan ® Mark 100 Automatic Water Conditioner*, Cat. No. 01-8818-91 Rev. Apr. 1994.

*Culligan Mark 87G Water Conditioners*, Culligan International Company (Date Unknown).

Grunbeck Wasseraufbereitung brochure, *Weichwassermeister GS* 2 (Date Unknown).

Cillit–Parat CD brochure (Date Unknown).

Benckiser brochure, *Bewados Flüssigschutz* (Date Unknown).

Benckiser brochure, *Der neue Bewamat SE Super–Electronic* (Date Unknown).

*Primary Examiner*—Emanuel T. Voeltz
*Assistant Examiner*—M. Kemper
*Attorney, Agent, or Firm*—Gerstman, Ellis & McMillin, Ltd.

[57] ABSTRACT

A water softening apparatus is provided including a water tank, a brine tank, chlorination electrodes for providing chlorination to water flowing in the water tank and a circuit for providing electrical energy to the chlorination electrodes. A microprocessor controls the circuit, with the microprocessor being software controlled to determine when regeneration should commence, when backwash should terminate, when brine/slow rinse should commence, when the chlorination electrodes should be energized, when the chlorination electrode energization should terminate, when brine/slow rinse should terminate, when fast rinse should commence, and when fast rinse should terminate.

5 Claims, 6 Drawing Sheets

WATER SOFTENING APPARATUS WITH MICROPROCESSOR CONTROL

FIELD OF THE INVENTION

The present invention concerns a novel water softening system and, more particularly, a system for regeneration of a water softener which is microprocessor controlled.

BACKGROUND OF THE INVENTION

In Rak U.S. Pat. No. 3,627,133, entitled Chlorine Generator For Water Softeners, a chlorine generator is disclosed for insertion in the brine flow line between a water softener tank and a brine tank. The chlorine generator produces chlorine from the brine and includes a pair of electrodes which are energized in response to a control circuit to produce an electrical chemical reaction for the production of chlorine gas from a portion of the brine.

In Rak et al. U.S. Pat. No. 4,299,698, entitled Circuit and Apparatus For Controlling A Water Softener, an apparatus is disclosed for regenerating the ion exchange bed of a water softener. The apparatus includes an electronic control circuit using a probe carrying, two pairs of spaced electrodes which are connected in a bridge circuit. The upper pair of electrodes comprise a sensor cell and the bottom pair of electrodes comprise a reference cell. A control signal and a reference signal are obtained from the sensing cell and reference cell for closing an energizing circuit and latching it until it is time for regeneration, which will occur at preset times to avoid interfering with normal water usage.

We have discovered a system in which the entire regeneration cycle of a water softener, including backwash, brine/slow rinse, chlorination and fast rinse, are controlled by a microprocessor with the desired timing being entered manually on a keypad and displayed to an operator. Thus it is an object of the present invention to provide a system utilizing our discovery of a water softener having a microprocessor controlled regeneration, including, among other things, a microprocessor controlled chlorinator in which the timing of the chlorination is software driven.

Other objects and advantages of the present invention will become apparent as the description proceeds.

SUMMARY OF THE INVENTION

In accordance with the present invention, a water softening apparatus is provided which includes a water tank, a brine tank and chlorination electrodes for providing chlorination to water flowing to the water tank. The apparatus includes a circuit for providing electrical energy to the electrodes and a microprocessor is included for controlling the circuit.

In the illustrative embodiment, the microprocessor is software controlled to determine when regeneration should commence, when backwash should commence, when backwash should terminate, when brine/slow rinse should commence, when the chlorination electrodes should be energized, when the chlorination electrodes energization should terminate, when brine/slow rinse should terminate, when fast rinse should commence, and when fast rinse should terminate.

In the illustrative embodiment, the microprocessor is programmed to start chlorination when the brine/slow rinse commences. A manually operable keypad is provided for manually entering information to the microprocessor concerning the desired timing of the chlorination. A display is provided for displaying the information entered manually via the keypad.

In the illustrative embodiment, the circuit includes a solid state switch driven by the microprocessor and a relay controlled by the solid state switch. The electrical energy is provided to the chlorination electrodes in response to the operation of the relay.

A more detailed explanation of the invention is provided in the following description and claims, and is illustrated in the accompanying drawings.

DETAILED DESCRIPTION OF THE ILLUSTRATIVE EMBODIMENT

Figure 1:
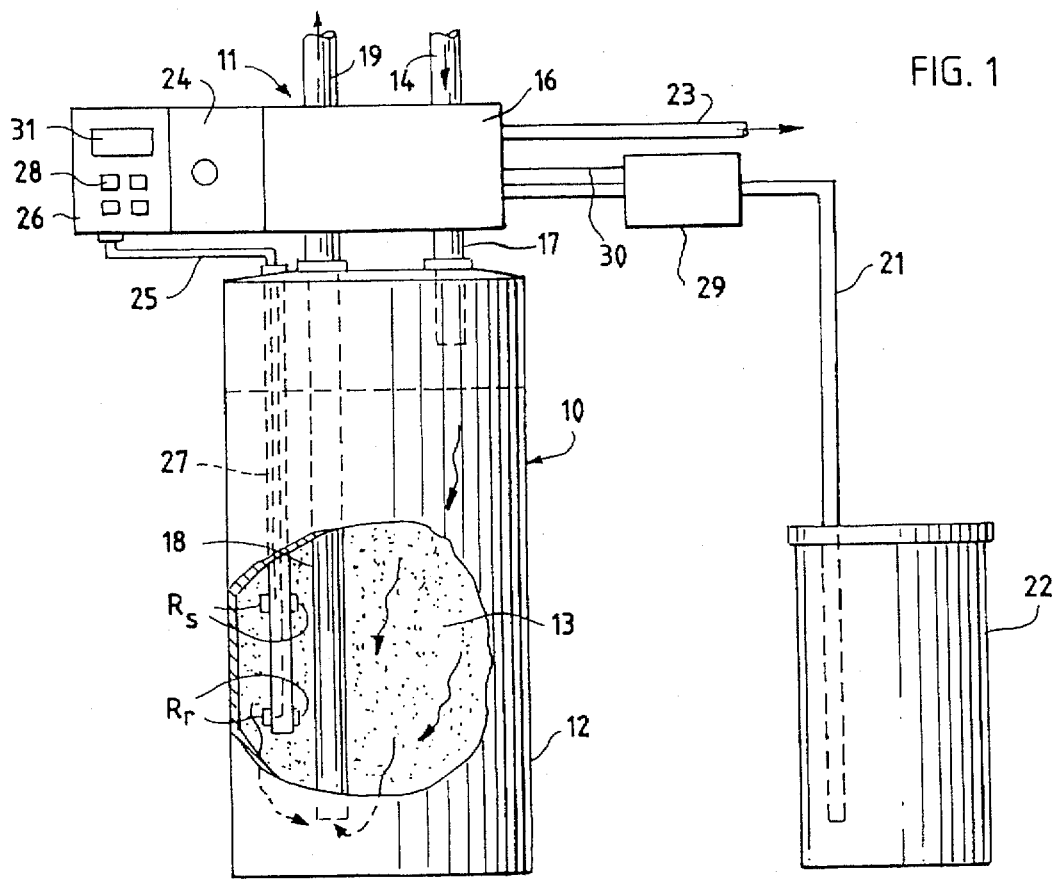
FIG. 1 is a an elevational view of a water softening system in accordance with the principles of the present invention, with certain portions cut away for clarity.

Referring to FIG. 1, a water conditioning or softening apparatus or device 10 is illustrated having a control unit 11. The water conditioning apparatus 10 includes a water tank 12 containing a bed 13 of suitable ion exchange resin. In order to provide water to the tank, a water supply line 14 is connected via valve housing 16 which passes the water through a pipe 17 extending to the tank 12. The water passes down through the bed 13 and is removed via pipe 18 through the valve housing 16 to a line 19 which supplies the softened water to the water system. A conduit 21 extends from the valve control to a brine tank 22 which contains salt for forming the brine. A drain conduit 23 is also connected to the valve housing 16 and is connected to a suitable drain.

The control valve structure 16 may be of a type that is well known to those skilled in the art, and the specific control valve structure does not form a part of the present invention. A recycling control 24 controls the recycling of the system and is controlled by a microprocessor-controlled circuit 26, which is illustrated schematically and in block form in FIG. 2. Control circuit 26 is connected via lines 25 to two pairs of vertically mounted electrodes $R_s$ and $R_r$, which are mounted in a suitable holding probe unit 27 (FIG. 1) which extends down into the water tank 12. Electrodes $R_s$ and $R_r$ are vertically spaced relative to each other for detecting the impedance difference of the solution in the water tank between the electrodes $R_s$ which form sensing cell $R_s$ and electrodes $R_r$ which form reference cell $R_r$. This determines whether regeneration is armed.

In pending John E. Zabinski U.S. application Ser. No. 08/604,733, filed on the same day as the present application and entitled Water Softening System With Self-Adjusting Rinse Cycle, and assigned to the assignee of the present invention, a microprocessor-based water softening system is disclosed in which a determination is made whether the slow rinse cycle of a regeneration has been completed or is abnormal. The disclosure of the pending Zabinski patent application for Water Softening System With Self-Adjusting Rinse Cycle is incorporated by reference into this specification.

Although the illustrative embodiment of the present invention utilizes spaced electrodes for detecting the impedance difference of the solution, it is to be understood that the determination as to whether regeneration is armed could be made using a flowmeter or using a timer instead of or in addition to using spaced electrodes.

A chlorine generator 29 is inserted in conduit 21 through which all of the concentrated brine passes during regeneration, the brine providing a source for chlorine. Chlorine generators are well-known in the art and an example of a chlorine generator that is inserted in the brine tank conduit is disclosed in Rak U.S. Pat. No. 3,627,133. Chlorine generator 29 is electrically connected to microprocessor controlled circuit 26 via line 30, also shown schematically in FIG. 2.

Figure 2:
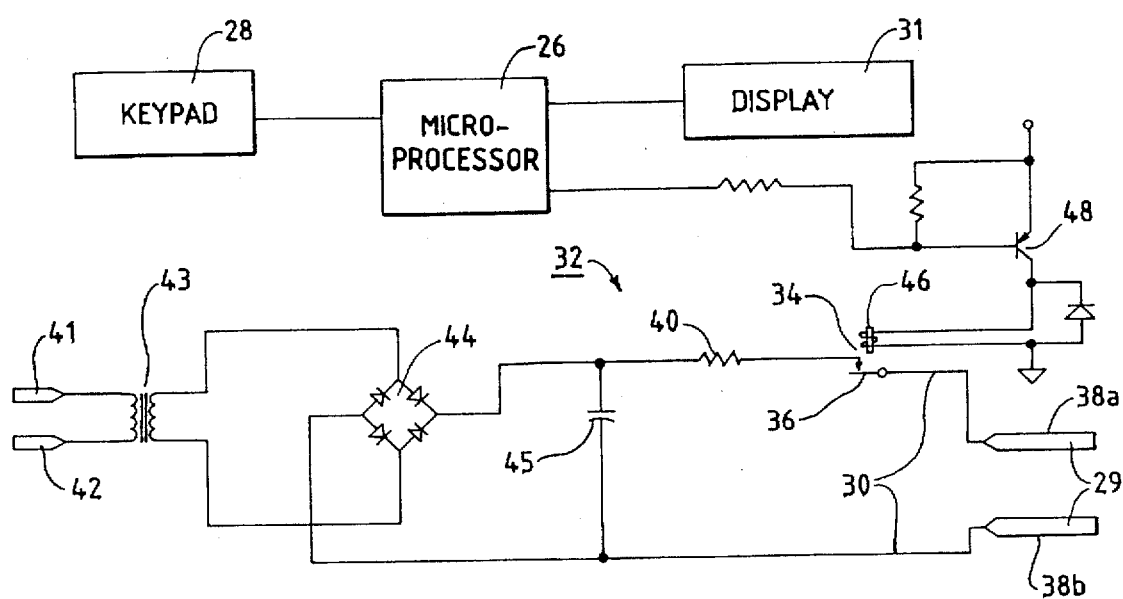
FIG. 2 is a circuit and block diagram of a control circuit for the water softening system of FIG. 1.

Referring to FIG. 2, chlorine generator 29 includes a pair of electrodes 38a and 38b, with a DC voltage being applied across the electrodes when the chlorine generator 29 is in operation.

The control circuit 32, illustrated in FIG. 2, includes a single pole single throw relay 34 with relay arm 36 in series with anode 38a of the chlorine generator 29 and also in series with current limiting resistor 40. The alternating current input lines 41 and 42 are connected through transformer 43 to a full wave rectifier 44 for providing direct current across the chlorine generator electrodes. A filter capacitor 45 is connected at the output of the full wave rectifier 44.

A relay arm 36 is controlled by relay winding 46 which is coupled to the collector of PNP transistor 48, which transistor is driven by microprocessor 26. Microprocessor 26 controls the entire regeneration of the water softener, including the backwash cycle, the brine draw/slow rinse cycle, the chlorine generator energization, and the fast rinse cycle. A flowchart illustrating the microprocessor control of the regeneration is set forth in FIGS. 3a–3e, described below.

Microprocessor 26 is software driven with information being manually entered via keypad 28 and displayed via display 31. For example, various cycle times may be entered manually via keypad 28. In addition, the length of time for the chlorine generator to be energized may be entered via keypad 28. In the illustrative embodiment, energization of the chlorine generator 29 will be simultaneous with commencement of the brine draw/slow rinse cycle and will occur when microprocessor 26 provides an output signal to transistor 48 to drive relay 36 and start the chlorination.

The operation of the microprocessor control is illustrated in flowchart form in FIGS. 3a–3e.

Referring to FIGS. 3a–3e, after start (60) a determination is made whether the regeneration is armed (61). This determination is made based upon the impedance difference of the solution in the water tank between the reference cell $R_r$ and the sensing cell $R_s$. As stated above, if desired the determination whether the regeneration is armed (61) could be made using a flowmeter or using a timer, instead of or in addition to using spaced cells.

If regeneration is armed, a determination is made whether it is the time of day for regeneration to occur (62). As an example, the system may be set so that regeneration can only occur between 2:00 a.m. and 6:00 a.m. If it is regeneration time, then regeneration is started (63) and the motor is turned on (64). A determination is made whether the motor is at backwash (65). If it is set to backwash, backwash time is loaded (66) and backwash will continue until the timer times out (67). Once the timer times out the motor is turned on (68) and a determination is made whether the motor is at brine draw/slow rinse (69). If it is at brine draw/slow rinse, the chlorinator time is loaded (70) and the slow rinse time is also loaded (71). The chlorinator relay 34 is turned on (72) and a determination is made when the chlorinator timer times out (73). Once the chlorinator timer times out, the chlorinator relay 34 is turned off (74).

Figure 3A:
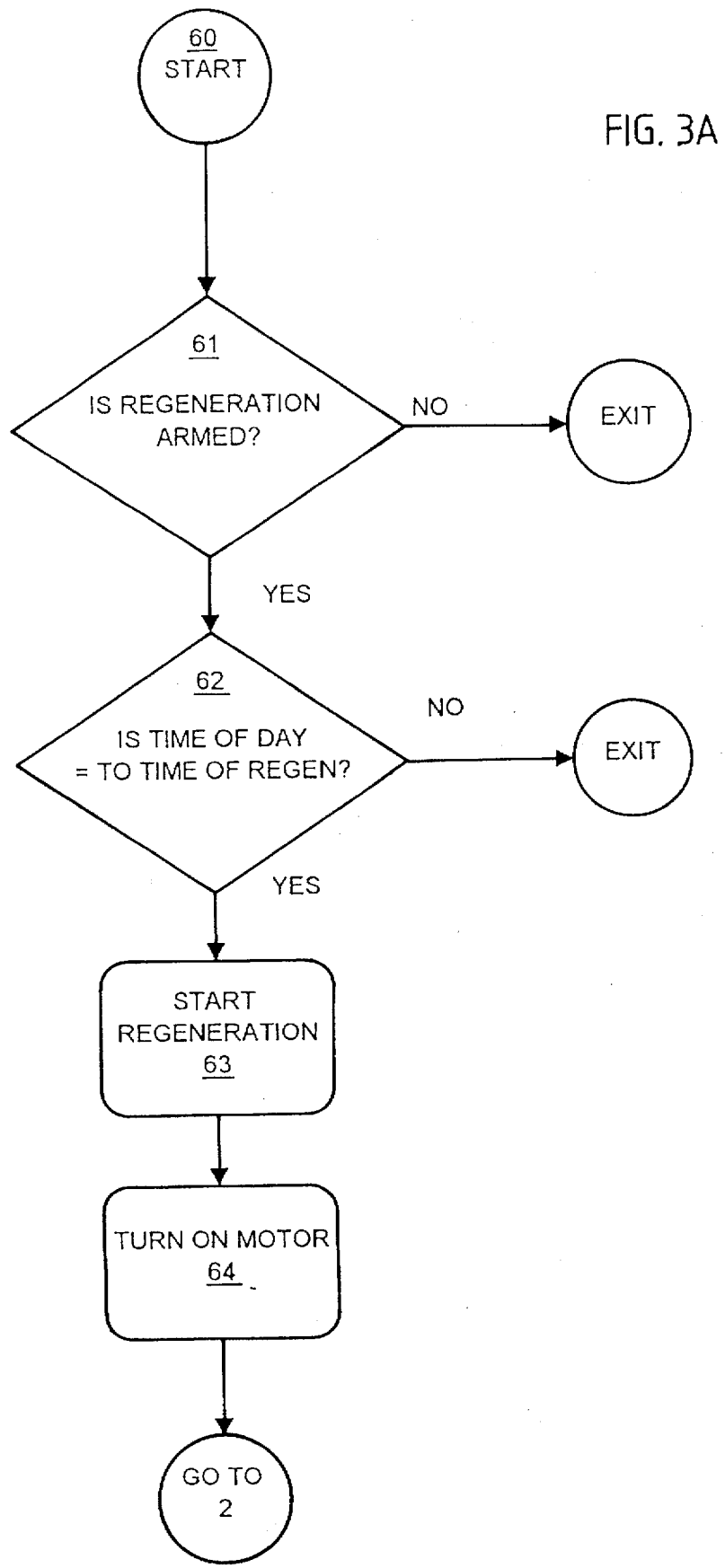
FIGS. 3a–3e comprise a flow chart showing the microprocessor-controlled regeneration.
Figure 3B:
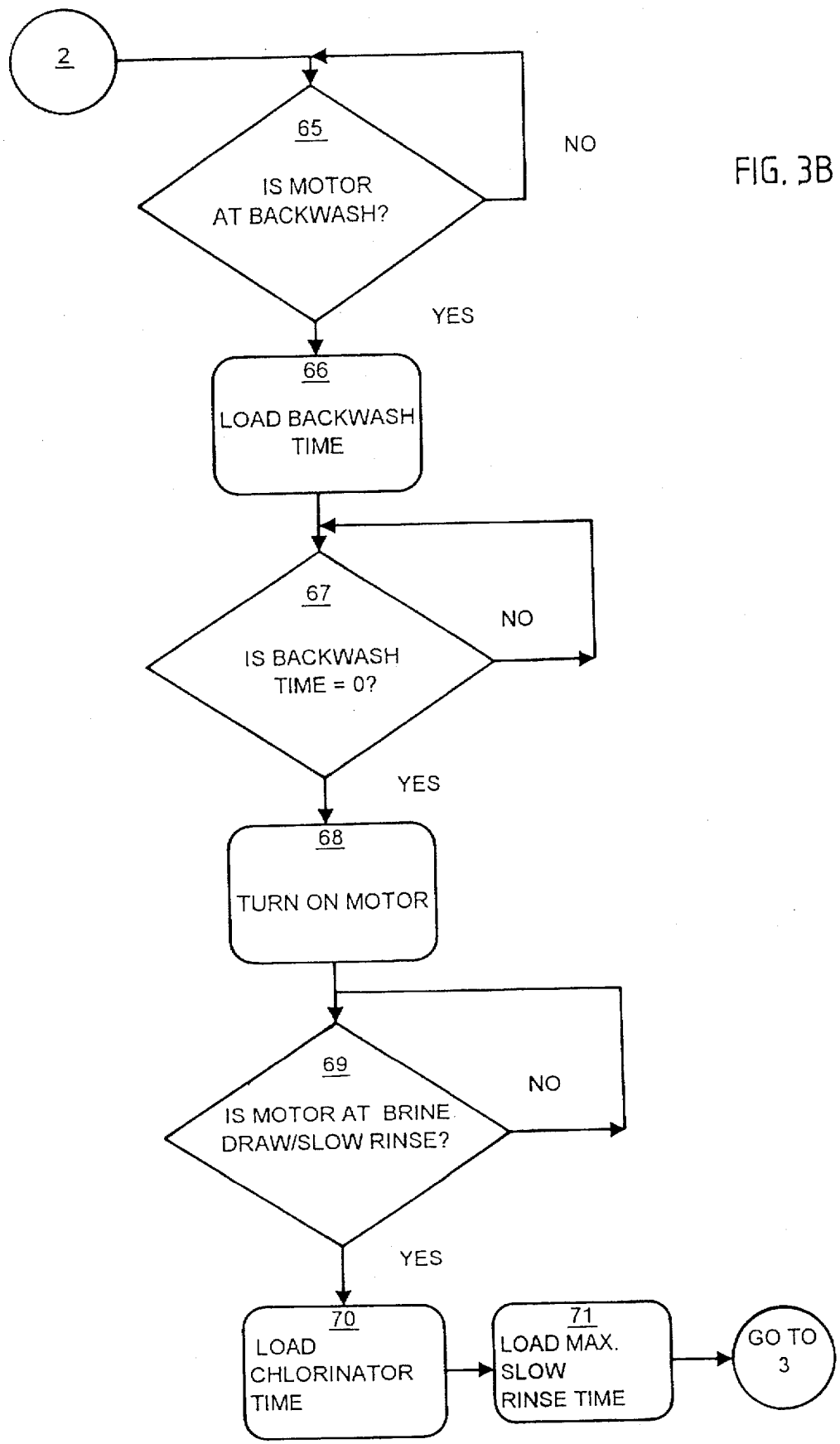
Figure 3C:
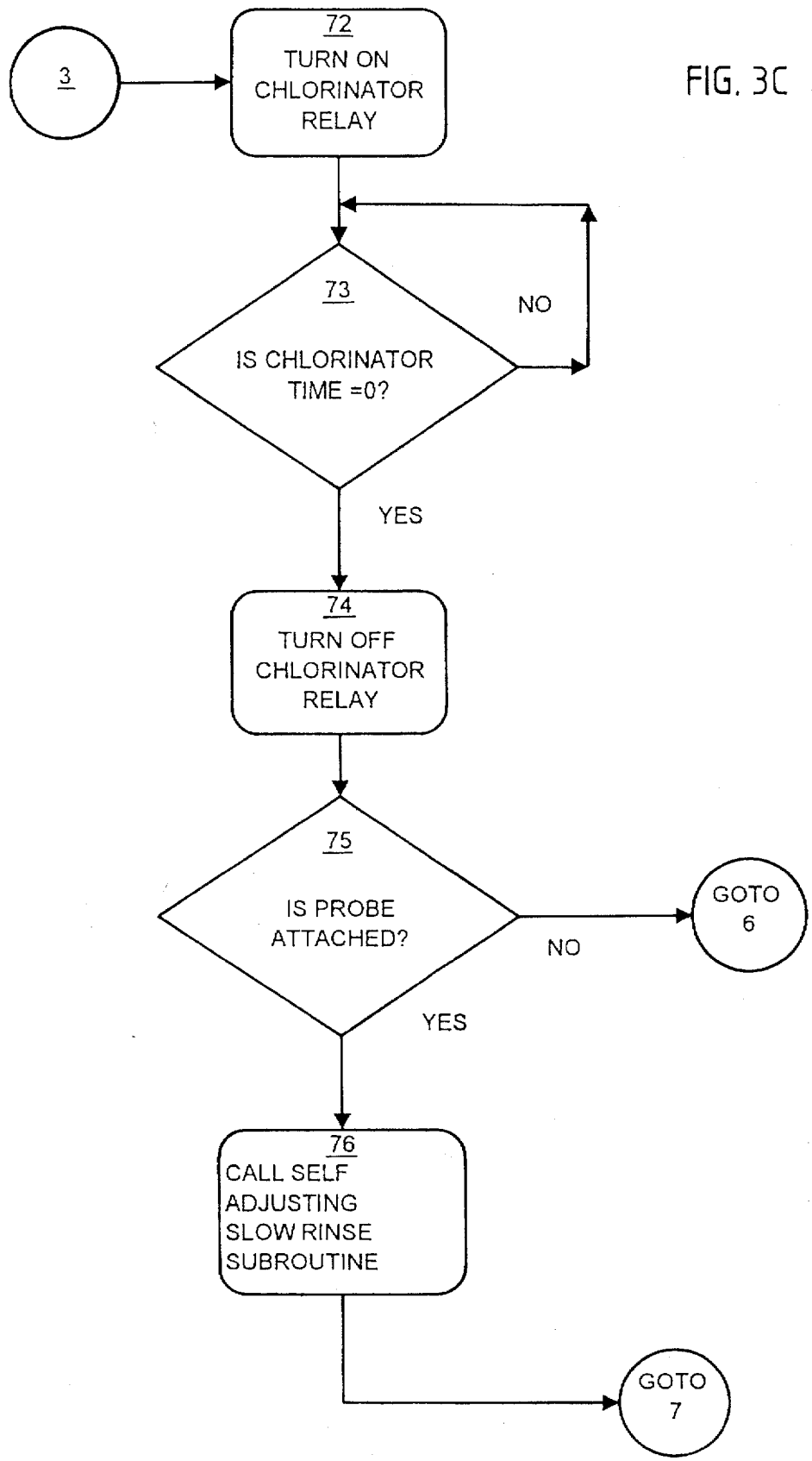
Figure 3D:
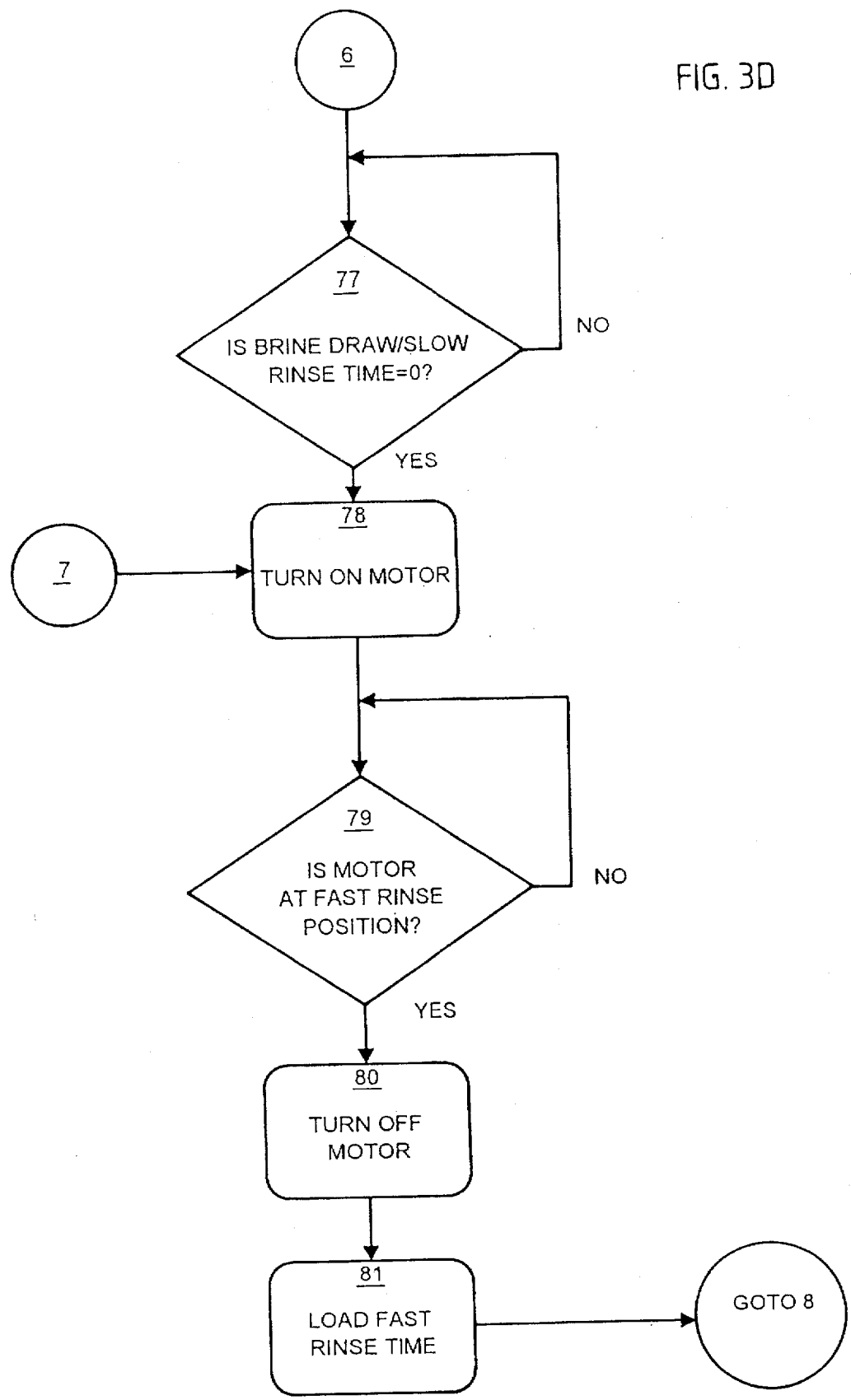
Figure 3E:
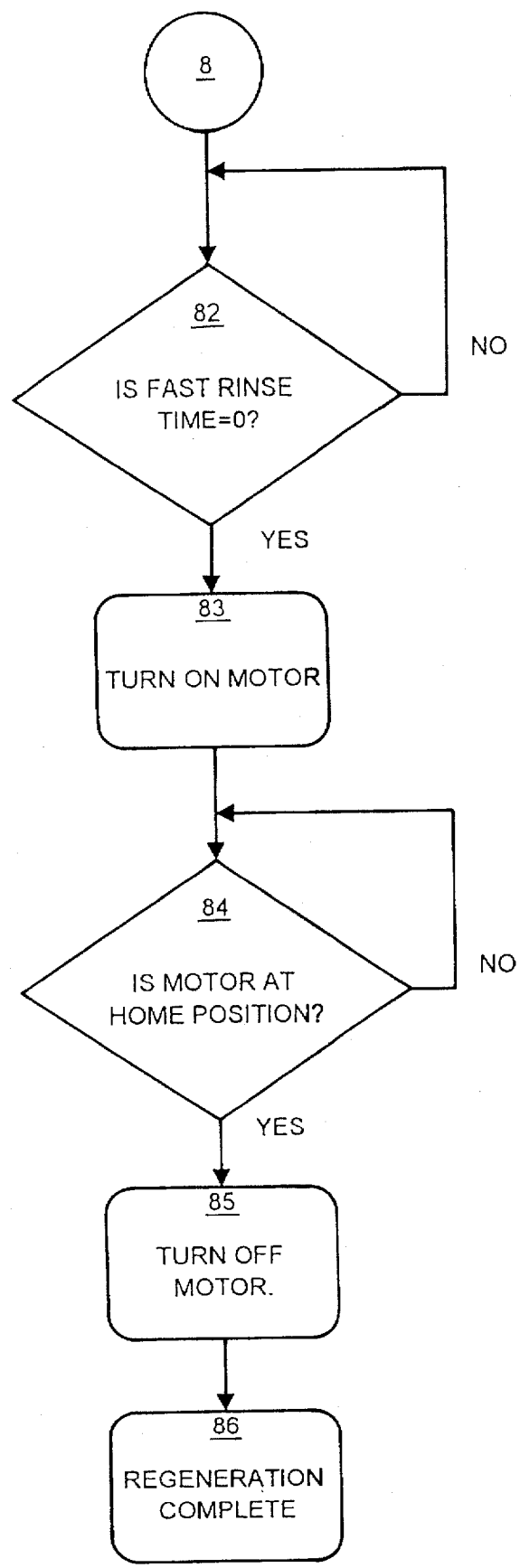

A determination is made whether the probe 27 is attached (75). If it is attached, the self-adjusting slow rinse subroutine is called (76). Referring now to FIG. 3d, after the slow rinse subroutine is performed (77) the motor is turned on (78) and a determination is made as to whether the motor is at fast rinse position (79). Once the motor is at fast rinse position, the motor is turned off (80) and the fast rinse time is loaded into the timer (81). When the fast rinse timer times out (82), the motor is turned on (83) and a determination is made whether the motor is at home position (84). If the motor is at home position the motor is turned off (85) and regeneration is complete (86).

It can be seen that a novel microprocessor controlled water softening apparatus has been disclosed.

Although an illustrative embodiment of the invention has been shown and described, it is to be understood that various modifications and substitutions may be made by those skilled in the art without departing from the novel spirit and scope of the present invention.

We claim:

1. A water softening apparatus, which comprises:

a water tank;

a brine tank;

chlorination electrodes for providing chlorination to water flowing in said water tank;

a circuit for providing electrical energy to said electrodes;

a microprocessor for controlling said circuit, said microprocessor being software controlled to determine when regeneration should commence, when backwash should commence, when backwash should terminate, when brine/slow rinse should commence, when said chlorination electrodes should be energized, when said chlorination electrode energization should terminate, when brine/slow rinse should terminate, when fast rinse should commence, and when fast rinse should terminate;

said circuit including a solid state switch driven by said microprocessor and a relay controlled by said solid state switch, said electrical energy being provided to said chlorination electrodes in response to the operation of said relay.

2. A water softening apparatus as defined by claim 1, said microprocessor being programmed to start chlorination when brine/slow rinse commences.

3. A water softening apparatus as defined by claim 1, including a manually operable keypad for manually providing information to the microprocessor concerning the desired timing of said chlorination, and a display for displaying the information entered manually via said keypad.

4. A water softening apparatus, which comprises:

a water tank;

a brine tank;

chlorination electrodes for providing chlorination to water flowing to said water tank;

a circuit for providing electrical energy to said electrodes;

a microprocessor for controlling said circuit;

said circuit including a solid state switch driven by said microprocessor and a relay controlled by said solid state switch;

said electrical energy being provided to said chlorination electrodes in response to the operation of said relay;

a manually operable keypad for manually providing information to the microprocessor; and a display for displaying the information entered manually via said keypad;

said microprocessor being software controlled to determine when regeneration should commence, when backwash should commence, when backwash should terminate, when brine/slow rinse should commence, when said chlorination electrodes should be energized, when said chlorination electrode energization should terminate, when brine/slow rinse should terminate, when fast rinse should commence, and when fast rinse should terminate.

5. A water softening apparatus as defined by claim 4, in which said microprocessor is programmed to start chlorination when brine/slow rinse commences.

* * * * *